US012742522B2

(12) United States Patent
Piltz et al.

(10) Patent No.: US 12,742,522 B2
(45) Date of Patent: Sep. 22, 2026

(54) MATERIAL SUPPLY SYSTEM

(71) Applicant: VERSUM MATERIALS US, LLC, Tempe, AZ (US)

(72) Inventors: Thomas William Piltz, New Tripoli, PA (US); John Paul Prego, Pennsburg, PA (US)

(73) Assignee: Versum Materials US, LLC, Tempe, AZ (US)

( * ) Notice: Subject to any disclaimer, the term of this patent is extended or adjusted under 35 U.S.C. 154(b) by 270 days.

(21) Appl. No.: 18/245,138

(22) PCT Filed: Sep. 15, 2021

(86) PCT No.: PCT/US2021/050505
§ 371 (c)(1),
(2) Date: Mar. 13, 2023

(87) PCT Pub. No.: WO2022/060866
PCT Pub. Date: Mar. 24, 2022

(65) Prior Publication Data

US 2025/0277564 A1 Sep. 4, 2025

Related U.S. Application Data

(60) Provisional application No. 63/080,481, filed on Sep. 18, 2020.

(51) Int. Cl.
*F17C 13/04* (2006.01)

(52) U.S. Cl.
CPC ..... *F17C 13/045* (2013.01); *F17C 2205/0111* (2013.01); *F17C 2205/0142* (2013.01);
(Continued)

(58) Field of Classification Search
CPC .................................................... F17C 13/045
See application file for complete search history.

(56) References Cited

U.S. PATENT DOCUMENTS 3,643,677 A * 2/1972 Begleiter .................. B64B 1/62
137/113
4,341,234 A * 7/1982 Meinass ................ F17C 13/045
137/113
(Continued)

FOREIGN PATENT DOCUMENTS

CN 104302962 A 1/2015
CN 107111324 A 8/2017
(Continued)

OTHER PUBLICATIONS

"Extended European Search Report received for European Patent Application No. 21870152.2 mailing date Jun. 21, 2024", 12 Pages.
(Continued)

*Primary Examiner* — Paul R Durand
*Assistant Examiner* — Michael J. Melaragno
(74) *Attorney, Agent, or Firm* — Versum Materials US, LLC; Daniel A. DeMarah, Jr.

(57) ABSTRACT

This invention provides gas supply and dispensing system and method of operating the same, comprising first on-stream vessel and first standby vessel, wherein the system is used to dispense gas at a preset gas flow rate; sensors in communication with a controller to sense a predefined endpoint of the first on-stream vessel thereby causing the controller to initiate auto-crossing from the first on-stream vessel to the first standby vessel in the array having gas therein, for subsequent dispensing of gas from the first standby vessel; wherein the controller after sensing the predefined endpoint initiates flow of gas from the first standby vessel, the first standby vessel thereby becoming the second on-stream vessel dispensing gas concurrently with the first on-stream vessel for a period prior to terminating the flow of gas from the first on-stream vessel.

32 Claims, 5 Drawing Sheets

(52) U.S. Cl.
CPC ................. *F17C 2205/0146* (2013.01); *F17C 2205/0323* (2013.01); *F17C 2205/0338* (2013.01); *F17C 2250/032* (2013.01); *F17C 2250/036* (2013.01); *F17C 2250/0421* (2013.01); *F17C 2250/043* (2013.01); *F17C 2250/0439* (2013.01); *F17C 2250/0443* (2013.01); *F17C 2250/0473* (2013.01); *F17C 2250/0636* (2013.01); *F17C 2250/077* (2013.01); *F17C 2270/0518* (2013.01)

(56) References Cited

U.S. PATENT DOCUMENTS 5,239,856 A * 8/1993 Mettes ............... G01N 33/0018 73/1.05
5,454,408 A * 10/1995 DiBella ................. F04B 9/1176 141/47
6,604,555 B2 * 8/2003 Blatt ......................... F17C 5/00 141/1
7,104,292 B2 * 9/2006 Wodjenski ............ F17C 13/045 141/99
7,290,170 B2 * 10/2007 Anderson ........... G06F 11/2017 714/13
8,088,248 B2 * 1/2012 Larson ............. C23C 16/45561 156/345.33
8,359,112 B2 * 1/2013 Kephart ................... G05B 9/03 714/13
2005/0051233 A1 * 3/2005 Wodjenski ............ F17C 13/045 141/104
2006/0032550 A1 * 2/2006 Wodjenski ............ F17C 13/045 141/248
2006/0196884 A1 * 9/2006 Gerken ................ B67D 7/0272 222/64
2008/0282709 A1 * 11/2008 Sugawara ............... F17C 13/02 62/48.1
2010/0224264 A1 * 9/2010 Homan ............... H01L 21/2225 137/602
2020/0208783 A1 * 7/2020 Lim ...................... F17C 13/023
2023/0287992 A1 * 9/2023 Fontana ................ F16K 49/002
2023/0408034 A1 * 12/2023 Piltz .......................... F17C 5/06

FOREIGN PATENT DOCUMENTS

CN 110332458 A 10/2019
DE 2940755 C2 4/1986
JP H07-286700 A 10/1995
JP 2007-524793 A 8/2007
JP 2008543563 A 12/2008
JP 2014-126283 A 7/2014
JP 2018-151043 A 9/2018
KR 10-2004-0081972 A 9/2004
TW 201343532 A 11/2013
TW M549851 U 10/2017
WO 2005/025715 A2 3/2005
WO 2006083363 A2 8/2006
WO 2007/002288 A2 1/2007
WO 2013126685 A1 8/2013
WO 2018/232292 A1 12/2018
WO WO-2022060866 A1 * 3/2022 ................ F17C 7/00

OTHER PUBLICATIONS

"International Preliminary Report on Patentability received for PCT Application No. PCT/US2021/050505, mailing date Mar. 30, 2023,", 7 Pages.
"International Search Report and Written Opinion received for PCT Application No. PCT/US2021/050505, mailing date Dec 20, 2021", 8 Pages.

* cited by examiner

MATERIAL SUPPLY SYSTEM

CROSS-REFERENCE TO RELATED APPLICATIONS

This application is a National Stage filing under 35 U.S.C. 371 of International Patent Application No. PCT/US2021/050505, filed Sep. 15, 2021, which claims priority to U.S. Provisional Patent Application 63/080,481 filed on Sep. 18, 2020.

BACKGROUND OF THE INVENTION

The present invention relates generally to any material (solid, liquid or gas) that is stored in and supplied as a gas from dispensing vessels, and particularly to multi-vessel arrays that require successive change-over to provide ongoing supply of a gas to a gas-consuming process unit or units. In a specific aspect, the invention may relate to a gas cabinet or bulk supply system containing multiple storage and dispensing vessels providing gas to semiconductor manufacturing tools in a semiconductor manufacturing facility, and to auto-crossing systems for cross-over of vessels to maintain continuity of gas dispensing.

Materials are provided to many processes for manufacturing, particularly in semiconductor manufacturing. Some materials are gases, liquids or solids that are stored in vessels and dispensed as gases to semiconductor manufacturing equipment or tools, such as, deposition chambers, etching chambers, and ion implanters. Typically, the process materials are stored in cylinders, but may be stored in any storage container, such as Y-cylinders, ampoules, ISO containers, or tanks. The materials may be stored at elevated or subatmospheric pressures in the containers.

In one application to semiconductor manufacturing, the gas storage and dispensing vessels of the foregoing type are frequently deployed in gas cabinets, in which a plurality of vessels are manifolded to appropriate flow circuitry or manifolds, e.g., including piping, valves, restricted flow orifice elements, flow regulators, mass flow controllers, purge loops, instrumentation and monitoring equipment, etc. Such flow circuitry may be associated with automatic crossing systems that permit a storage and dispensing vessel to be taken off-stream when it is exhausted of gas or otherwise approaching empty status, e.g., by appropriate crossing of valves from on to off (or from open to closed), so that the exhausted or otherwise substantially depleted vessel is isolated from gas feed relationship with the flow circuitry, to facilitate change-out of the vessel. Subsequently or concurrently, a full gas storage and dispensing vessel is crossed on, e.g., by appropriate crossing of flow control valves from off to on (or from closed to open) in a manifold to place such fresh vessel into gas feed relationship with the flow circuitry. The isolated depleted vessel then can be uncoupled from the flow circuitry and removed from the gas cabinet, to enable installation of a full vessel for subsequently cross-over usage of such vessel during the ensuing operation when the previously crossed-on vessel has become depleted of gas.

The gas dispensing hardware and electronics can be programmably configured to effect automatic vessel change-over at a preset pressure, when a first vessel reaches a point of depletion at which it is no longer able to maintain the preset pressure. For such purpose, the gas dispensing hardware and electronics can be constructed and arranged for automated or manual evacuation, purging and leak detection of the gas flow path. A programmable logic controller (PLC) can be used in the system for monitoring valve status, system pressures, vessel weights and temperatures, and for providing preprogrammed sequences for control of the following functions: vessel change-out, initiating gas flow, auto-crossover of vessels, purge gas control, process/purge gas evacuation, securing process gas flow followed by shut-down, and temperature control of vessel heaters, e.g., heating blankets.

Thus, vessels, for example standard cylinders or adsorbent-based and/or internal pressure regulator-equipped types can be deployed in multi-vessel arrays, in which automatic cross-over of vessels, from a depleted vessel to a full vessel, takes place when the endpoint of an active (on-stream) vessel is reached. The endpoint may be determined in various ways—it may be determined by a decline in dispensed gas pressure and/or flow rate indicative of depletion of the vessel contents, or it can be determined by weight loss of the vessel incident to continued dispensing of gas therefrom, or by cumulative volumetric flow of dispensed gas, or by predetermined operating time, or in other suitable manner.

Regardless of the means or mode of determining the endpoint of the vessel, the automated crossing from a depleted vessel to a full one involves a large drop in the pressure and a disruption in the flow of the gas. This pressure drop during changeover may cause the pressure to drop below set point (preset pressure) limits triggering a response. Such pressure disruption may cause alarms to be actuated, and in an extreme pressure variation condition, the safety monitoring elements of the gas delivery system may cause shut-down of the gas flow and undesired stoppage of the downstream gas-consuming process. Alternatively, if the system's process controls are calibrated to allow for such a large drop in pressure, the system may be slow to react to an actual problem that is causing a large pressure drop and needs to be fixed.

The change in pressure during a crossover in a typical prior art gas delivery system, such as a Versum Materials' GASGUARD® gas delivery cabinet is illustrated in FIG. 1. FIG. 1 shows the substantial drop in pressure between cylinder cross-over. The change in pressure is variable and may have an unpredictable effect on the flow of gas, for example, to a deposition tool and the resulting film generated therein and thereby. The effect on the flow of the gas will have a resultant negative impact on the variability of the process in question.

It would therefore be an advance in the art to provide an automated crossing apparatus and method for gas delivery systems (for dispensing gas) which minimize pressure perturbations incident to vessel crossing.

BRIEF SUMMARY OF THE INVENTION

The present invention relates generally to material storage and dispensing vessels, and particularly to multi-vessel arrays that require successive change-over from an exhausted one or more vessels to a fresh material-containing one or more vessels in the array, in order to provide ongoing supply of gas to a gas-consuming process.

This invention provides a gas supply and dispensing system, comprising an array of at least two gas storage and dispensing vessels arranged for sequential on-stream dispensing involving crossover from a first one or more on-stream vessels to a first one or more standby vessels in the array, said system used to dispense gas at a preset gas flow rate; at least one controller; and one or more sensors in communication with the controller, wherein said one or more sensors sense one or more predefined endpoints of the first one or more on-stream vessels thereby causing the controller to initiate auto-crossing from the first one or more on-stream vessels to the first one or more standby vessels in the array having gas therein, for subsequent dispensing of gas from said first one or more standby vessels; wherein the controller after sensing the one or more predefined endpoints initiates flow of gas from said first one or more standby vessels, said first one or more standby vessels thereby becoming the second one or more on-stream vessels dispensing gas concurrently with said first one or more on-stream vessels for a period prior to terminating the flow of gas from the first one or more on-stream vessels.

This invention further provides a method of substantially reducing pressure variation of gas dispensed from a gas supply and dispensing system comprising an array of at least two gas storage and dispensing vessels arranged for sequential on-stream dispensing involving crossover from a first one or more on-stream vessels to a first one or more standby vessels in the array, said system used to dispense gas at a preset gas flow rate comprising the steps of supplying the process gas from said first one or more on-stream vessels; depleting the process gas from said first one more on-stream vessels; sensing one or more predefined endpoints for said one or more first on-stream vessels; opening one or more valves to begin supplying the process gas from said first one or more standby vessels, said first one or more standby vessels thereby becoming the second one or more on-stream vessels dispensing the process gas concurrently with said first one or more on-stream vessels; increasing the flow of the process gas from the second one or more on-stream vessels above a preset flow rate; detecting the increased flow rate from the second one or more on-stream vessels;

returning the gas flow from the second one or more on-stream vessels to the preset flow rate; and closing one or more valves to isolate the first one or more on-stream vessels from the system.

This invention provides the benefit of decreasing the large change in pressure due to the crossover of the supply of gas by one or more vessels to another one or more vessels in a gas delivery system.

Other aspects, features, and embodiments of the present invention will be more fully apparent from the ensuing disclosure and appended claims.

DETAILED DESCRIPTION OF THE INVENTION

Figure 2:
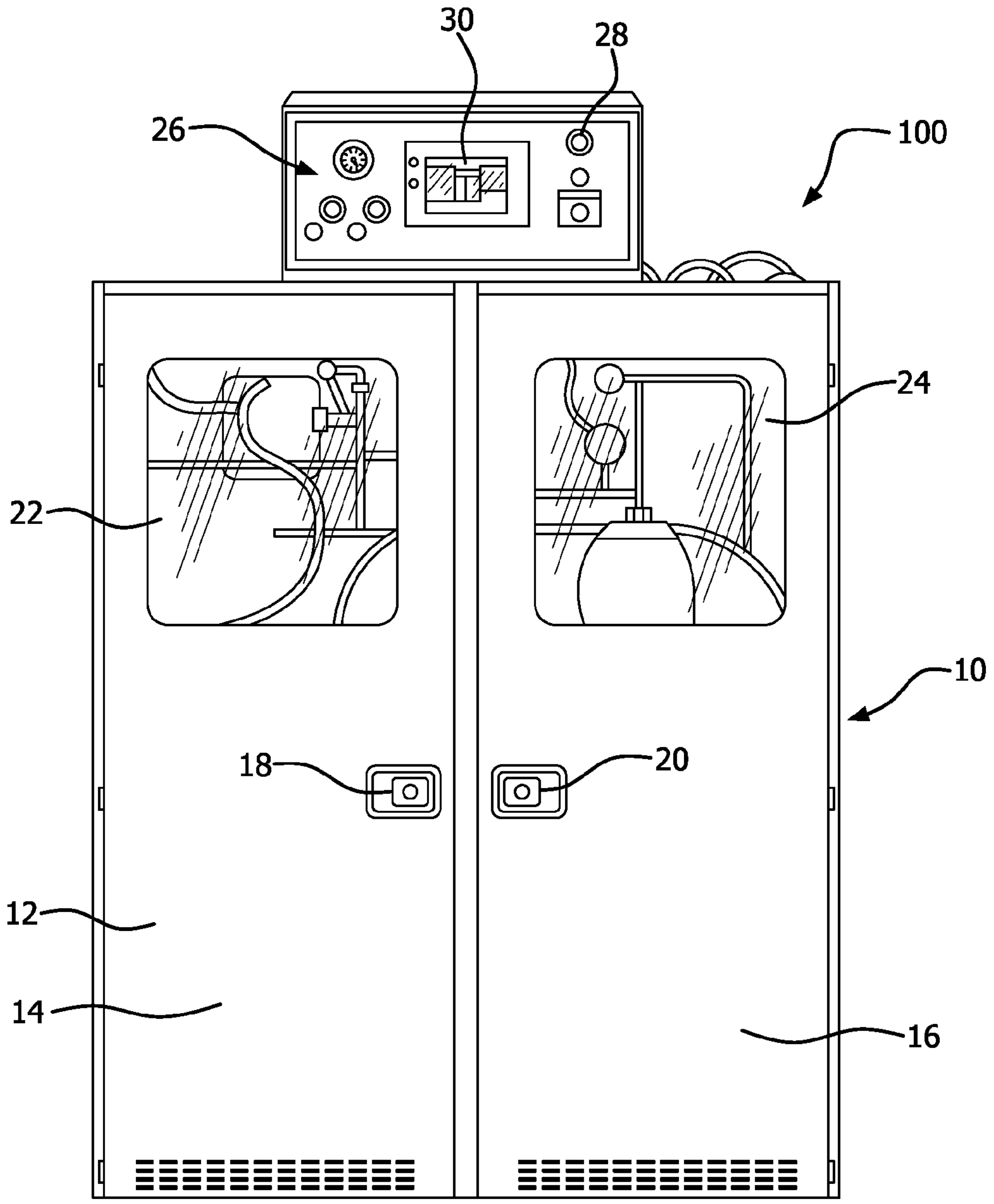
FIG. 2 front view of a gas delivery system with vessel crossover capability according to one embodiment of the invention.
Figure 3:
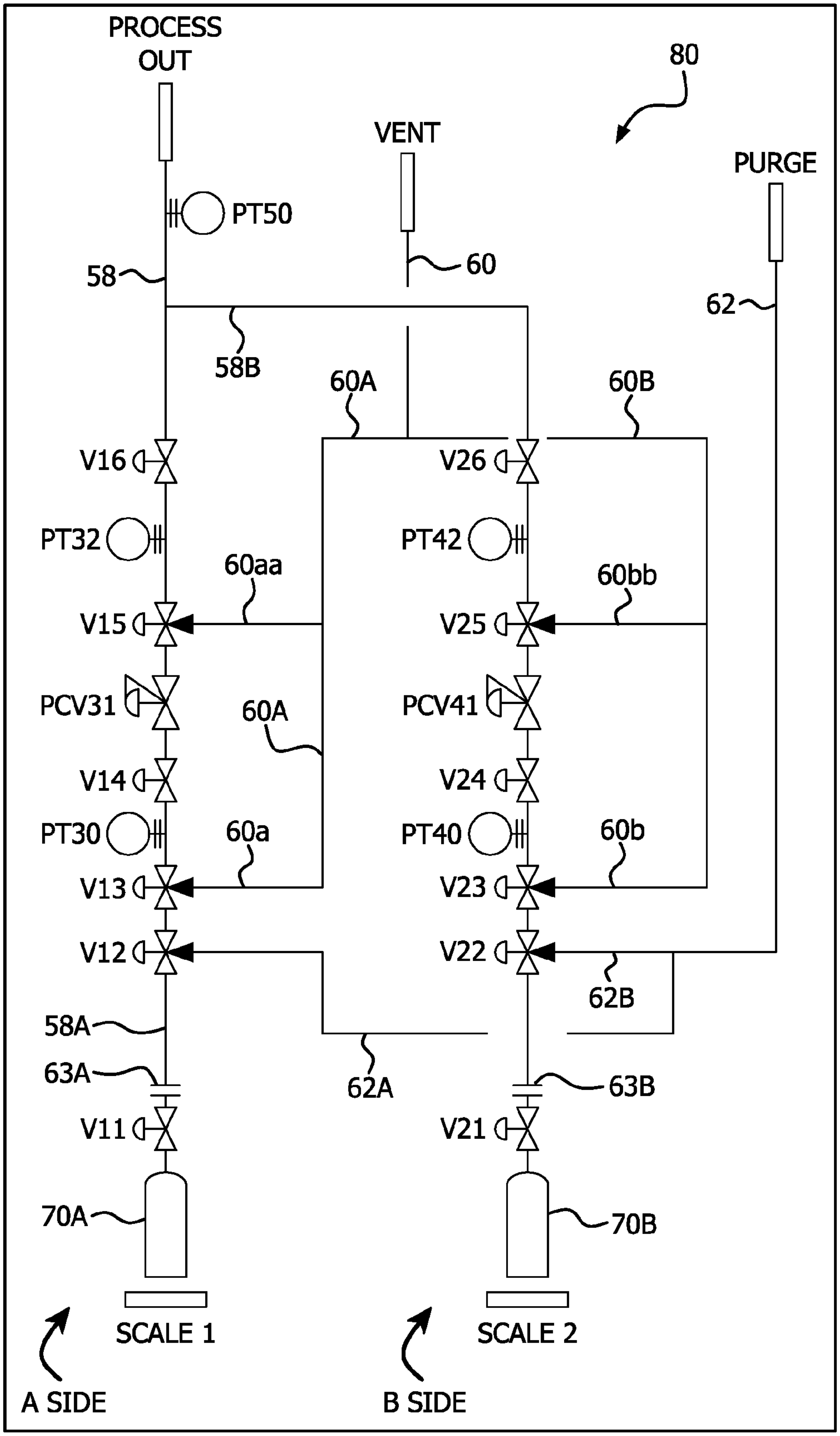
FIG. 3 is a schematic of the flow manifold of the gas delivery system of one embodiment of this invention.

The present invention provides an automated crossing apparatus and method for gas delivery or dispensing systems for multiple vessel arrays. The delivery of gas may be from two gas supply vessels to a single outlet connection, as shown in the embodiment of FIGS. 2 and 3. As shown, the system is constructed and arranged to control automatic crossover from the on-stream gas supply vessel to the back-up or standby gas supply vessel upon depletion of the on-stream gas supply vessel. After replacing the depleted gas vessel, the system can be reset or will automatically reset to autocross back to the now refilled or replaced standby gas vessel. In alternative embodiments, more than two vessels may be connected to a single outlet, more than one vessels may be on-line and/or more than one vessels may be on standby and each of the vessels may be separately manifolded to the outlet and separately controlled. In this embodiment, typically the system comprises the same number of vessels on standby as are on-line; however, any number of vessels may be on-line and any number of vessels may be on-standby in a system.

Note the terms delivery and dispense will be used interchangeably herein, and the terms on-stream and on-line will also be used interchangeable herein. Additionally although the term cross-over will be used, the cross-over may not be to limited to back and forth between only one or more vessels that are on-line and one or more vessels that are on-standby, meaning there can be any number of groups of one or more vessels on-line and any number of groups of one or more vessels that are on standby. For example, the array of vessels may comprise two or more vessels or two or more groups of vessels that are separately controlled (each typically having a separate manifold having at least one flow regulator, at least one valve and at least one sensor) that are on-line and only one vessel or one group of one or more vessels that are on standby, and vice versa, that is, the array of vessels may comprise two or more vessels or two or more groups of vessels that are separately controlled (each typically having a separate manifold having at least one flow regulator, at least one valve and at least one sensor) that are on standby and only one vessel or one group of one or more vessels that are on on-line. The term "endpoint" or "predefined endpoint" will be used to describe a sensed setpoint that triggers the system to begin the crossover. It is understood that the predefined endpoint will likely be a value, for example for some embodiments, in the case of gas pressure that is greater than the lowest value possible (that is, it is not the actual end), but is substantially less than the desired preset setpoint for the gas pressure, for example. The term depleted is a relative term and does not necessarily mean completely empty. The preset gas flow rates, as well as the other values that are measured or sensed, may be varied from time to time due to changing process gas demands on the system or other reasons. The use of open language, such as, "comprising" and "having" in the description and the claims includes the partially closed and closed transition language: "consisting essentially of" and "consisting of", and therefore, that language may be substituted for comprising anywhere it appears. Similarly, any list "selected from" also includes "selected from the group consisting of" and may be substituted accordingly.

The present invention is based on the discovery that the adverse pressure effects of cross-over of material storage and dispensing vessels in a multi-vessel array can be eliminated by the provision of having the on-stream one or more vessels and the standby one or more vessels provide gas simultaneously until one or more of the following are satisfied: a set-point pressure as measured by one or more pressure transducers in the system is reached (typically below the desired preset gas flow rate), or a measured period of time has passed, or a set flow rate is reached in the automated change-over system or weight of the on-line cylinders has fallen below a set-point weight, or a high or low temperature set point has been reached different from a preset temperature. Once one or more of those criteria are satisfied, the on-stream one or more vessels are shut off and the previously standby (fresh supply) one or more vessels supply the process gas. By this invention the pressure drop due to the shutting down the on-line one or more vessels and bringing the stand-by one or more vessels online is substantially or fully eliminated.

FIG. 2 is a front view of one embodiment of a gas delivery system 100 incorporating the vessel crossover capability of one embodiment of the invention.

Figure 1:
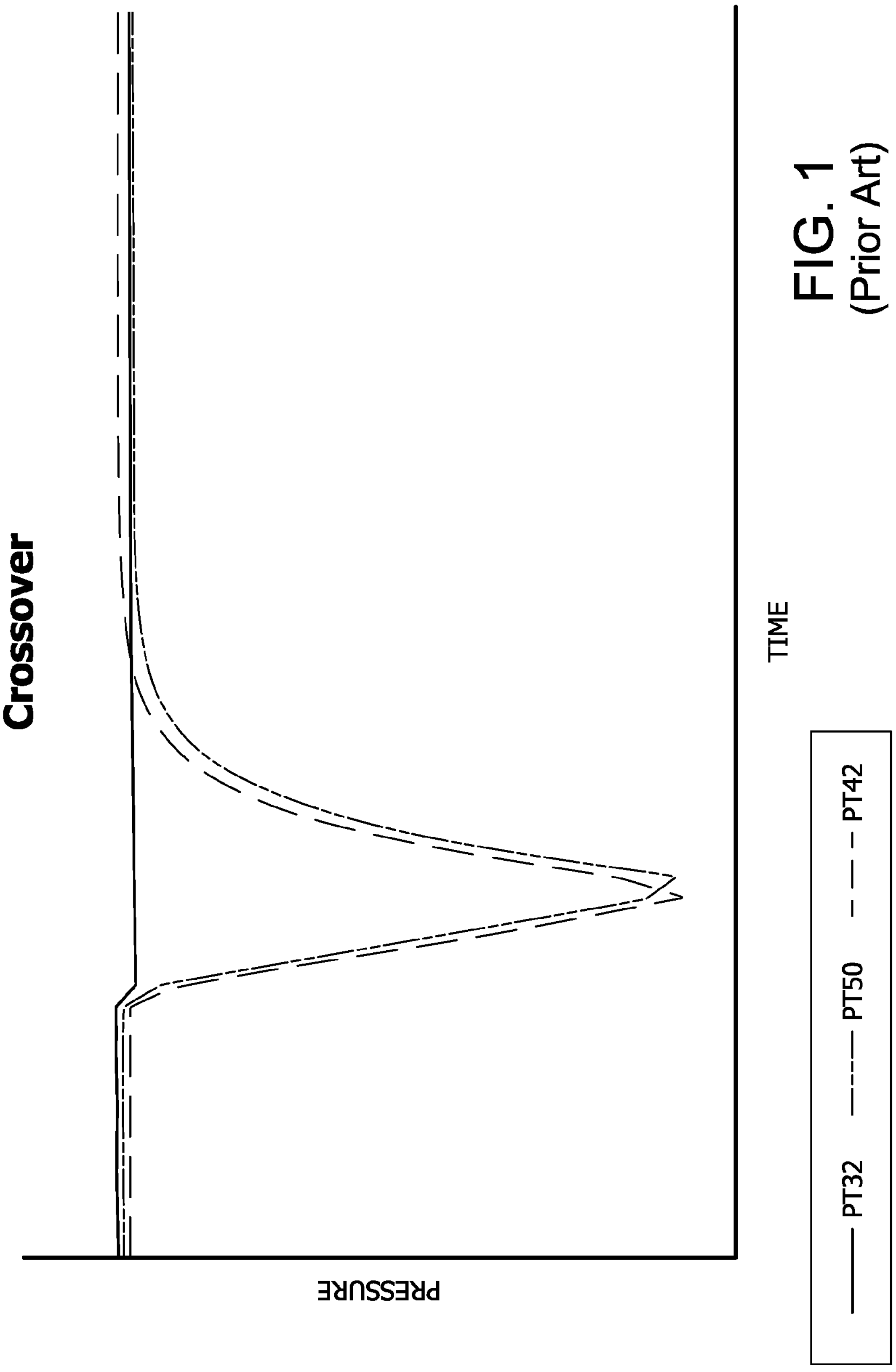
FIG. 1 (Prior Art)
FIG. 1 is a graph of pressure vs. time measured during the crossover of a prior art gas delivery system.

In one embodiment, the gas delivery system 100 may comprise a main cabinet 12 as a primary enclosure, and an electronics enclosure 26, wherein the main cabinet and the electrical enclosure are bolted together to form the integrated gas delivery system. A gas supply manifold and the gas supply vessels may be housed within the main cabinet 12, which may for example be constructed of 12-gauge cold rolled steel. The main cabinet 12, as shown, features left hand door 14 with latch 18 and viewing window 22, and right hand door 16 with latch 20 and viewing window 24. The electronics enclosure 26, featuring a screen interface 30 and an on/off button 28 is mounted on top of the main cabinet 12, as illustrated. The windows 22, 24 may be fire-rated safety glass window to allow visual inspection of the condition of the manifold prior to opening a door. In alternative embodiments, the gas delivery system may be remotely controlled and/or removal of cylinders may be performed by robots and therefore the gas delivery system may not have a touch screen, buttons or even a metal cabinet as shown in FIG. 1. In alternative embodiments, the electronics, such as the controller and all related wiring, may be located within the main cabinet, if desired. In yet other embodiments, the main cabinet and the electronics enclosure may be optional and/or replaced with, for examples, a valve manifold box or valve manifold panel that do not house the one or more vessels and/or a separate controller, located away from the manifolds and the one or more vessels.

As shown, the electronics enclosure 26 includes a programmable logic controller (PLC) for control of the integrated gas delivery system via the touch screen interface 30, with communication between the PLC unit and the touch screen being effected via a serial port connection on the PLC unit. The screen has a touch sensitive grid that corresponds to text and graphics and communicates commands to the PLC unit. The touch screen displays user menus, operational and informational screens and security barriers to facilitate only authorized access to the system.

A programmable logic controller (PLC) can be used in the system for monitoring valve status, system pressures, vessel weights and temperatures, other sensors, and for providing preprogrammed sequences for control of the following functions: vessel change-out, initiating gas flow, auto-crossover of vessels, optional purge gas control, optional process/purge gas evacuation, securing process gas flow followed by shut-down, and optional temperature control of vessel heaters, e.g., heating blankets. In alternative embodiments, gas delivery systems of this invention may be controlled by a main overall controller for a semiconductor fab and/or a remotely located controller. It is therefore understood that the controller for the delivery system of this invention may comprise any type of controller that opens and closes valves and sounds alarms and the like based on programmed algorithms having preset variables or operating ranges, and set points that trigger actions, and the receipt of inputs from sensors in the delivery system including one or more of pressure transducers, valve positions, timers, flow controllers, scales, thermocouples or others.

In the embodiment shown, the main cabinet 12 contains a pair of gas storage and dispensing vessels, and the manifolds coupled to each vessel; the manifolds of which include piping, valving, etc. for gas flow, purge and venting.

The gas supply vessels, sometimes hereinafter referred to as cylinders, but not limited to cylinders, may be of any suitable type. In alternative embodiments, the vessels may be one or more Y-cylinders, ampoules, ISO containers, or tanks. The materials may be stored at elevated or sub-atmospheric pressures in the containers. The gas supply vessels may store the materials at pressures above atmospheric pressure or may store the materials at pressures below atmospheric pressure, such as, in the case of a solid-phase physical adsorbent-containing vessels having gas therein sorptively retained on the solid-phase physical adsorbent. The solid-phase physical adsorbents include for examples, a molecular sieve, activated carbon, silica, alumina, sorptive clay, macroreticulate polymer, metal organic frameworks (MOFs), etc., it is to be appreciated that the gas supply vessel may be of any other suitable type, in which is a material is held for dispensing of gas from the vessel. The gas supply vessels can contain process materials in a solid phase, liquid phase, or as a gas, compressed gas, or supercritical fluid. The vapor pressure of the contents can vary from 0 torr to 3000 psig, more.

FIG. 3 is a schematic of the flow circuitry or manifold 80 of the gas delivery system 100 of FIG. 2, including left gas storage and dispensing vessel 70A and right gas storage and dispensing vessel 70B interconnected with flow circuitry including manifold gas flow lines 58, 58A, 58B, 60, 60A, 60B, 62, 62A, and 62B. Side A (the left side as shown) of the manifold 80 of the system comprises piping and a cylinder labelled with a number having the suffix A, a or aa. Side A portion of the manifold 80 further comprises at least one valve, at least one control valve and at least one pressure transducer in the piping, more preferably at least two valves, at least one control valve and at least one pressure transducer in the piping. Side B portion of the manifold 80 of the system comprises piping and a cylinder labelled with a number having the suffix B, b or bb. Side B further comprises preferably at least one valves, at least one control valve and at least one pressure transducer in the piping, more preferably at least two valves, at least one control valve and at least one pressure transducer in the piping. In alternative embodiments, each manifold connected to a vessel may comprise at least one valve, and at least one regulator that controls the flow of gas from the vessel in the manifold. The regulator may be a control valve and at least one pressure transducer in indirect or direct communication therewith in the piping. The term manifold may refer to all of the piping and valving in the system and may also be used to describe the portion of the piping, valve(s) and sensor(s) connected to one or more on-stream vessels (or one or more standby vessels) in the system.

Piping with no suffix is in fluid communication with both of side A and side B (manifolds and cylinders) of the system. The flow circuitry of this arrangement has been designed for flow of pressurized gas which may have low internal volume and minimal dead volume. In the embodiment shown, there are four types of connections to the gas manifold flow circuitry: (i) a process gas outlet-manifold connection, (ii) an optional purge gas-manifold connection, (iii) a gas supply vessel-manifold connection, and (iv) vent-manifold connection. Each of these is discussed below.

In the process gas outlet-manifold connection, a downstream gas-consuming process unit (not shown in FIG. 3) is in fluid communication with a first end of process gas outlet line 58 and may be directly connected thereto. In the embodiment shown, gas line 58 may be a semiconductor fab's house line and comprises an optional pressure transducer PT50. Alternatively, the gas line 58 could be connected directly to a single tool or one or more tools. Optionally, gas line 58 may additionally contain manual and/or automatic valves, such as pneumatic valves, not shown. The process gas outlet line 58 also has joined thereto process gas feed lines 58A and 58B that are each connected to and provide the process gas from vessels 70A and 70B respectively to the process gas outlet line 58. Each process gas feed line comprises at least one automatic or manual valve and optionally comprise one or more automatic or manual valves, one or more pressure transducers and/or one or more regulators. In the embodiment shown in FIG. 2, process gas feed line 58A comprises a plurality of automatic valves V12, V13, V14, V15 and V16 in fluid communication with container 70A, and process gas feed line 58B comprises a plurality of automatic valves V22, V23, V24, and, V25 and V26 in fluid communication with container 70B. The preferred at least two valves of the system are a cylinder valve and a valve to isolate one portion of the manifold (and the cylinder) from the process gas outlet line. As shown for side A of the manifold, those valves include cylinder valve V11 and a valve V16 that isolates side A of the manifold and the cylinder 70A from the process gas outlet line 58. Further the manifold preferably comprises a control valve PCV31 and a pressure transducer PT32 for the side A of the manifold 80, wherein the pressure transducer PT32 may be used to control the control valve PCV31.

As shown FIG. 3, the valves V12, V13 and V15 are 3-way valves that are normally closed to the purge and vent lines, meaning they are normally open to the flow of the process gas in the process gas feed line 58A. The same applies to V22, V23, and V25 to the flow of the process gas in the process gas feed line 58B. The valves need to be actuated to open them to the purge and vent lines. However, different valves may be used in alternative embodiments, so when these valves are described as opened, it is understood that it means open to flow in the process gas feed lines 58A, 58B or the purge and vent lines as described, although the valve position may be considered "closed" for those 3-way valves to a person of ordinary skill in the art for the valves as shown in FIG. 3.

In the embodiment shown in FIG. 3, process gas feed line 58A comprises pressure transducers PT30 and PT32 and regulator PCV31 in fluid communication with container 70A, and process gas feed line 58B comprises pressure transducers PT40 and PT42 and regulator PCV41 in fluid communication with container 70B. Pressure transducers PT30 and PT40 monitor the pressure of the vessel 70A and 70B, respectively. Also, each of the vessels 70A and 70B have a valve incorporated or attached to each vessel, V11 and V21 respectively, such that the vessel may be isolated from the system when attached to the system 100 and isolated when not attached to the system, such as during changing an empty vessel for a full vessel. In the gas supply vessel-manifold connection, the gas storage and dispensing vessel 70A is joined to the process gas feed line 58A, via a releasable pipe connection 63A downstream of vessel valve V11. The gas storage and dispensing vessel 70B is joined to process gas feed line 58B via a releasable pipe connection 63B downstream of vessel valve V21.

In FIG. 3, two pressure transducers are located on the manifold in each of the process gas feed lines 58A, 58B and one pressure transducer is in process gas outlet line 58. Pressure transducer PT30 monitors the pressure associated with gas storage and dispensing vessel 70A and pressure transducer PT40 monitors the pressure associated with gas storage and dispensing vessel 70B. Pressure transducer PT50 monitors the outlet pressure of the process gas as flowed to the downstream gas-consuming process unit, or to the house line or other gas intermediary to the gas-consuming process unit.

In the optional purge gas-manifold connection, a source of purge gas (not shown in FIG. 3) is joined to purge gas feed line 62 at a first end thereof. At the second end of the purge gas feed line 62 splits into purge gas lines 62A and 62B, each of which is joined at an opposite end away from the split to each of the process gas feed lines 58A and 58B. As shown, the purge gas lines are connected to each of the process gas feed lines 58A and 58B via valves V12 and V22, respectively. Valves V12 and V22 are for isolating purge gas used during vessel changes or otherwise as needed or desired. The purge gas is optional and can be any combination of inert gases supplied at pressures between 0 psig and 3000 psig. The supply of a purge gas to clean out the process gas feed lines prior to and following a gas vessel change is particularly important to maintain the purity of the gas supplied and to prevent the escape of toxic or pyrophoric gases inside the manufacturing facility.

As shown, the purge gas can be introduced into process gas feed line 58A through valve V12 and may exit the process gas feed line 58A at a valve downstream of the introduction point of the purge gas into the process gas feed line. For example, the purge gas may enter process gas feed line 58A through valve V12 and exit the process gas feed line 58A through valve V15 to second purge gas exit line 60*aa* which connects to purge gas exit line 60A to vent line 60. Alternatively or additionally, the purge gas may enter process gas feed line 58A through valve V12 and exit the process gas feed line 58A through valve V13 to first purge gas exit line 60*a* which connects to purge gas exit line 60A to vent line 60. The open positions of valves V12, V13, V14 and/or V15 are automatically and/or manually operated to provide for the purge gas and venting described.

The source of purge gas that is joined to the purge gas feed line 62 to constitute the purge gas-manifold connection, may be any suitable purge gas source, such as a supply tank of a purge gas such as ultra-high purity nitrogen or ultra-high purity nitrogen/helium mixture, or other suitable single component or multi-component gas medium, as effective for the purging of the flow passages of the manifold lines and associated componentry. So-called "house nitrogen" (i.e., nitrogen available from the general supply utility in the semiconductor manufacturing facility) or clean dry air (CDA) from a suitable source thereof may be employed for this purpose.

The vent-manifold connection will now be described. Valves V13 and V23, on side A and side B of the manifold 80, respectively, provide vent access for process gas when the respective side is on-line for the pre-regulated or high pressure side of process gas feed lines 58A and 58B upstream of the regulators PCV31 and PCV41, respectively. Valves V15 and V25, on side A and side B of the manifold 80, respectively provide vent access to the post-regulator or low pressure side of the process gas feed lines 58A and 58B, respectively downstream of the regulators PCV31 and PCV41, respectively. Process gas may be directed to line 60*a* (60*b*) or 60*aa* (60*bb*), 60A (60B), and 60 to the vent from process gas feed line 58A (58B) by opening the valves just described and preferably also closing V16 or V26, respectively. The vent can be at atmospheric pressure or to a vacuum source (not shown) such as a Venturi vacuum generator or a vacuum pump. Further if needed or desired, valves V14 and V24 can be used to isolate the high pressure side (upstream of the regulator PCV31 and PCV41, respectively) of the process gas feed lines 58A and 58B from the low pressure side (upstream of the regulator PCV31 and PCV41, respectively). Directing the process gas in the manifold to the vent may become necessary in an emergency, during shut down or just prior to purging the manifold with a purge gas, for example as part of a cylinder change out.

Under normal operating conditions, either vessel 70A or vessel 70B would be supplying a process gas while the opposite vessel would be in standby. If vessel 70A is supplying the process, vessel valve V11, regulator isolation valve V14, regulator PCV31, and process isolation valve V16 are all open. If vessel 70B is supplying the process, vessel valve V21, regulator isolation valve V24, regulator PCV41, and process isolation valve V26 are all open; and, if vessel 70B is not supplying the process at a minimum, process isolation valve V26 is closed. The process isolation valve V26 is preferably located downstream of the one or more pressure transducers PT40, PT42, and control valve PCV41 in the process gas feed line 58B (and all are downstream of the cylinder 70B) on the Side B of the manifold 80. Note, any steps or valve positions and process steps performed on side A of the manifold is the same for the corresponding valves, etc on side B of the manifold after a cross-over and vice versa. Valves V12, V13 and V15 are open for flow in line 58A when vessel 70A is supplying. (Valves V22, V23 and V25 are open for flow in line 58B when vessel 70B is supplying.

Each of the output of regulators PCV31 and PCV41 are controlled based upon feedback from outlet pressure transducers PT32 and PT42 respectively located in the process outlet feed lines 58A and 58B or, alternatively, by pressure transducer PT50 in the process gas outlet line, or a combination of the pressure transducers. At least one of PT32 and PT42 or PT50 is present in the system for this purpose. Pressure transducer PT32 controls the flow on Side A of the manifold 80 from cylinder 70A, and pressure transducer PT42 controls the flow on Side B of the manifold from cylinder or vessel 70B. This control is achieved via a proportional-integral-derivative controller (PID) with a user-determined setpoint for pressure transducers PT32, PT42, and/or PT50 serving as the output goal. The pressure transducer measures the actual pressure in the line which is then compared to the setpoint pressure and used in a control loop to control the valve opening in the regulator. The output setpoint for both regulators PCV31 and PCV41 are typically identical under normal supply circumstances.

The operation of the gas supply system during crossover will now be described with reference to FIGS. 3 and 4.

Figure 4:
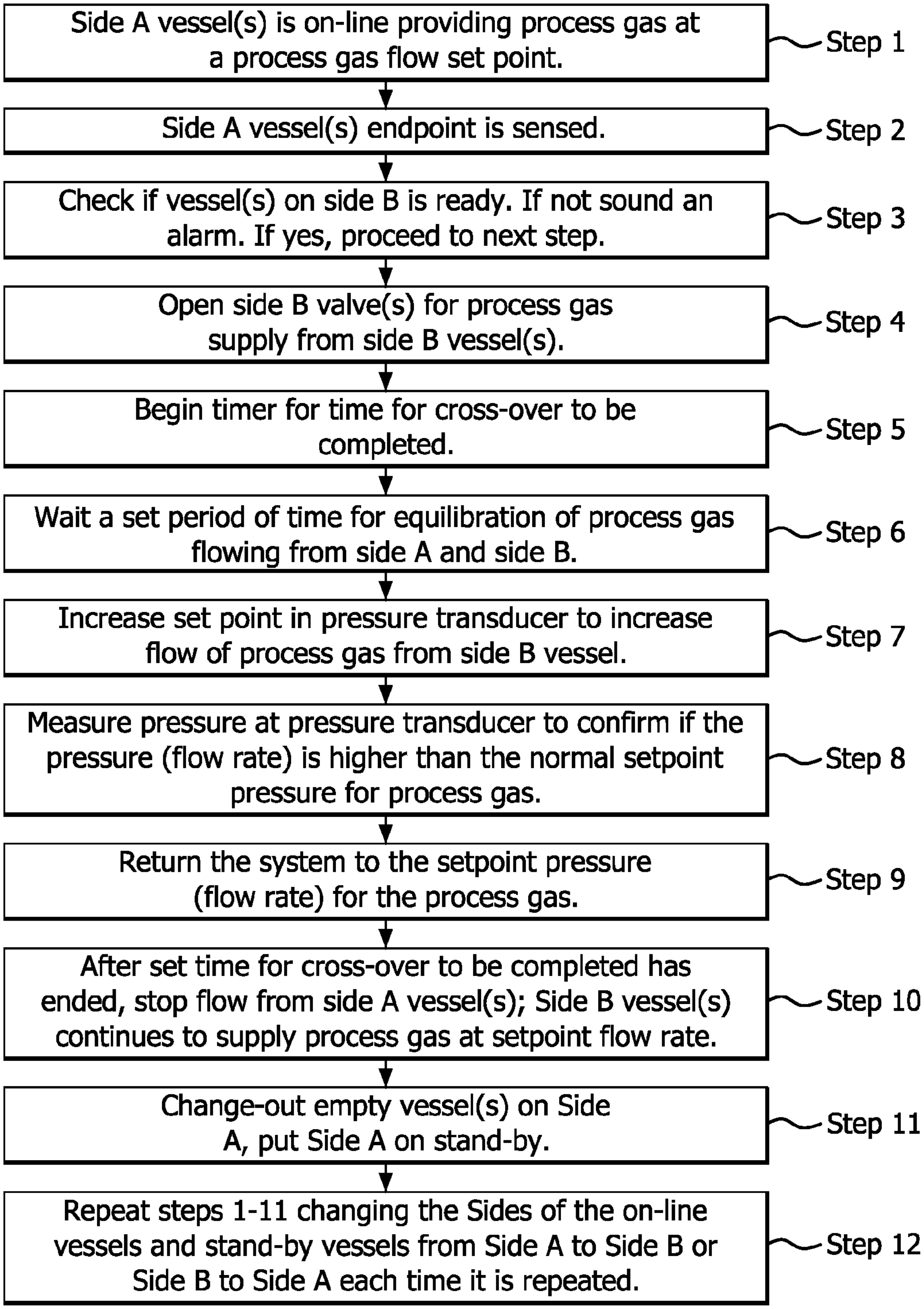
FIG. 4 is a process flow diagram including steps involved in an auto-crossover sequence according to one embodiment of the invention.

In the embodiment shown in FIGS. 3 and 4, in Step 1, vessel 70A and Side A manifold 80 are on-line and supplying the process gas and vessel 70B is connected to side B of the manifold, ready to deliver gas when needed and is in standby mode. Side B is isolated from Side A while Side A supplies gas until cross-over is initiated. (A prior empty vessel or vessel that was depleted to a desired degree on the B side of the manifold may have been replaced with vessel 70B containing the material necessary, preferably a full vessel, to provide the process gas.) As vessel 70A becomes depleted or reaches another change cylinder (begin crossover) predefined one or more endpoints, in Step 2, a low source notification or change cylinder signal is generated by either PT30 for low pressure and/or scale 19A for low weight or other indicator sensed predefined endpoint, such as cumulative time of dispensing. As yet another alternative, the empty/predefined endpoint may be determined by a diminution of flowrate of the dispensed gas measured by a pressure sensor, a decreased rate of change of one or more characteristics of the dispensed gas, (for example a phase change, or removal of the desired process gas from a solvent or solid adsorbent), and/or other indicator may be employed to establish or detect an end-stage limit (one or more predefined endpoints) to the gas dispensing involving the on-stream gas supply vessel.

Regardless of how determined, the predefined endpoint when reached is sensed (Step 2 in FIG. 4), e.g., by a weight sensor, pressure transducer, flowrate sensor, volumetric (cumulative) flowmeter, cycle timer, temperature sensor, or combinations thereof etc., as appropriate to the specific mode of determination of the predefined endpoint(s) (limit point(s)), and a predefined endpoint(s) or limit sensing signal(s) is generated in the electronics circuitry of the system, which is programmably arranged with the electronics circuitry (controller) of the gas delivery system to effect the auto-crossover sequence. The predefined endpoint-sensing signal (limit-sensing signal) causes the system to proceed to Step 3 to check on the presence and status of the cylinder on side B of the system. If the scale 19B, and/or other detection means, such as one or more pressure transducers (PT40 and/or PT42) and/or manually by operator input, indicate that the cylinder 70B is ready for use and is in standby mode, then the auto-crossover process will continue. If not, the system will sound an alarm.

In Step 4, if vessel 70B in Step 3 is determined to be in standby condition and therefore ready to support the flow of process gas therefrom, Vessel 70B is opened via actuation of vessel valve V21, if not previously opened. If V21 is a manual valve, that valve needs to be opened by an operator prior to entry into standby mode. If V21 is pneumatically actuated, it will be automatically opened by the system controller at this time. At the same time, process isolation valve V26 is also opened automatically by the system controller. In the embodiment shown, if any of valves V22, V23, V24 and V25 are closed, they will also be opened. Upon opening those valves process gas begins to flow from cylinder 70B through process outlet feed line 58B to process gas outlet line 58, and the automated crossover routine is initiated.

In Step 5, upon opening the vessel valve V21, the system and a timer in the electronic circuitry is activated that either counts up to a set time or starts at a set time and counts down to 0. The time period being the set time for the completion of the crossover of supply of the process gas from exhausted cylinder 70A to fresh cylinder 70B to be complete. The set time for crossover is typically from greater than 0 seconds to 1 hour, or 5 seconds to 30 minutes, or 5 seconds to 10 minutes.

In Step 6, an equalization timer is initiated at this time (either counting up to a set time or counting down from a set time) and the system waits for a preset equalization period of time that may be anywhere from greater than 0 seconds to 1 hour, or 5 seconds to 30 minutes, or 5 seconds to 10 minutes to allow for the equilibration of the flow of gas from both sides' cylinders, cylinder 70A from side A and cylinder 70 B from side B of the system. During this equalization period of time, the vessel 70A supply is still in the "lead"

position as the output of regulator PCV31 is still at a higher pressure than that of the "lag" regulator PCV41.

In Step 7, upon expiration of the equalization timer, and substantial equilibration of the process gas flowing from cylinders 70A and 70B, the setpoint pressure in either pressure transducer PT42 or PT50 (whichever is controlling regulator PCV41) is increased. The setpoint pressure in either pressure transducer PT42 or PT50 had been preset by the user (through the controller (PLC)) for supply of the process gas by the gas delivery system under normal supply conditions) is temporarily increased by between 0.01 psi and 10 psi to a temporary crossover setpoint pressure. This causes the regulator PCV41 to allow for an increase in flow of the process gas from vessel 70B and the B side of the manifold eventually achieving a higher setpoint pressure value than the flow of the process gas from the A side of the manifold. This step puts vessel 70B into the lead position and 70A into the lag position. The increased flow is maintained until Step 9 of the process.

In Step 8, the pressure transducer PT42 or PT50 measures the pressure to confirm that the pressure has reached the temporary crossover setpoint pressure. Once the pressure measured at either PT42 or PT50 exceeds the setpoint pressure for normal supply conditions, the vessel 70B is now considered to be in the "lead" position and vessel 70A is in the "lag" position.

In Step 9, upon confirmation by pressure transducer PT42 or PT50 of reaching the temporary crossover setpoint pressure, the system returns to the setpoint pressure under normal supply conditions for pressure transducer PT42 or PT50 and side B of the manifold is returned to the normal supply setpoint pressure PID of the regulator. Stated differently at this point, the temporary PCV41 output setpoint increase is removed and the original user-determined setpoint is reestablished.

In Step 10, after a previously specified amount of time has passed on the timer that began measuring time for the completion of the cross-over in Step 5 above, the system (if automated) or an operator (if manual) shuts off cylinder 70A, by shutting off one or more of: the cylinder or vessel valve V11, regulator isolation valve V14 (if present in the system) and process isolation valve V16 in any combination, and the process gas continues to be provided by Side B of the system including cylinder 70B. The time for completion of the cross-over prior to an alarm sounding which indicates a problem to an operator is between 1 second and 1 hour, or 5 seconds to 30 minutes, or 5 seconds to 10 minutes, to complete the process after V21 and V26 were opened in Step 4. The time for the completion of the cross-over allows for stabilization of control valve PCV41 as well as providing fault tolerance in case an error occurs with the vessel 70B side of the system during the crossover process. Possible errors include pneumatic valve failure or an operator not opening a manual isolation valve, if any are present in the system. Once the crossover alarm delay timer has expired and no errors are detected on the presently on-line fresh vessel 70B on the B side of the manifold, vessel isolation valve V11 and process isolation valve V16 are closed on the depleted vessel 70A on the A side of the manifold. Vessel 70B is now supplying the process with the regulator PCV41 output being controlled by feedback from either PT42 or PT50 using the normal supply setpoint pressure. Vessel 70A is considered expired and side A of the system is idle or offline.

In Step 11, the empty cylinder 70A is replaced with a fresh cylinder. This step 11 may comprise one or more additional steps in the process of this invention. Prior to removing empty cylinder 70A, side A of the manifold may undergo multiple optional venting and purging steps prior to and subsequent to removing the empty cylinder 70A and manually or automatically replacing empty cylinder A with a full fresh cylinder 70A. After making the necessary connections between the manifold side A piping and fresh cylinder 70A, optional leak checks may be performed, and cylinder 70A may be manually or automatically set in the controller (PLC) as ready and in standby mode.

Steps 1-11 are repeated for continued supply of the process gas as needed to the single process gas outlet line from the one or more vessels that are on-line.

Example

Figure 5:
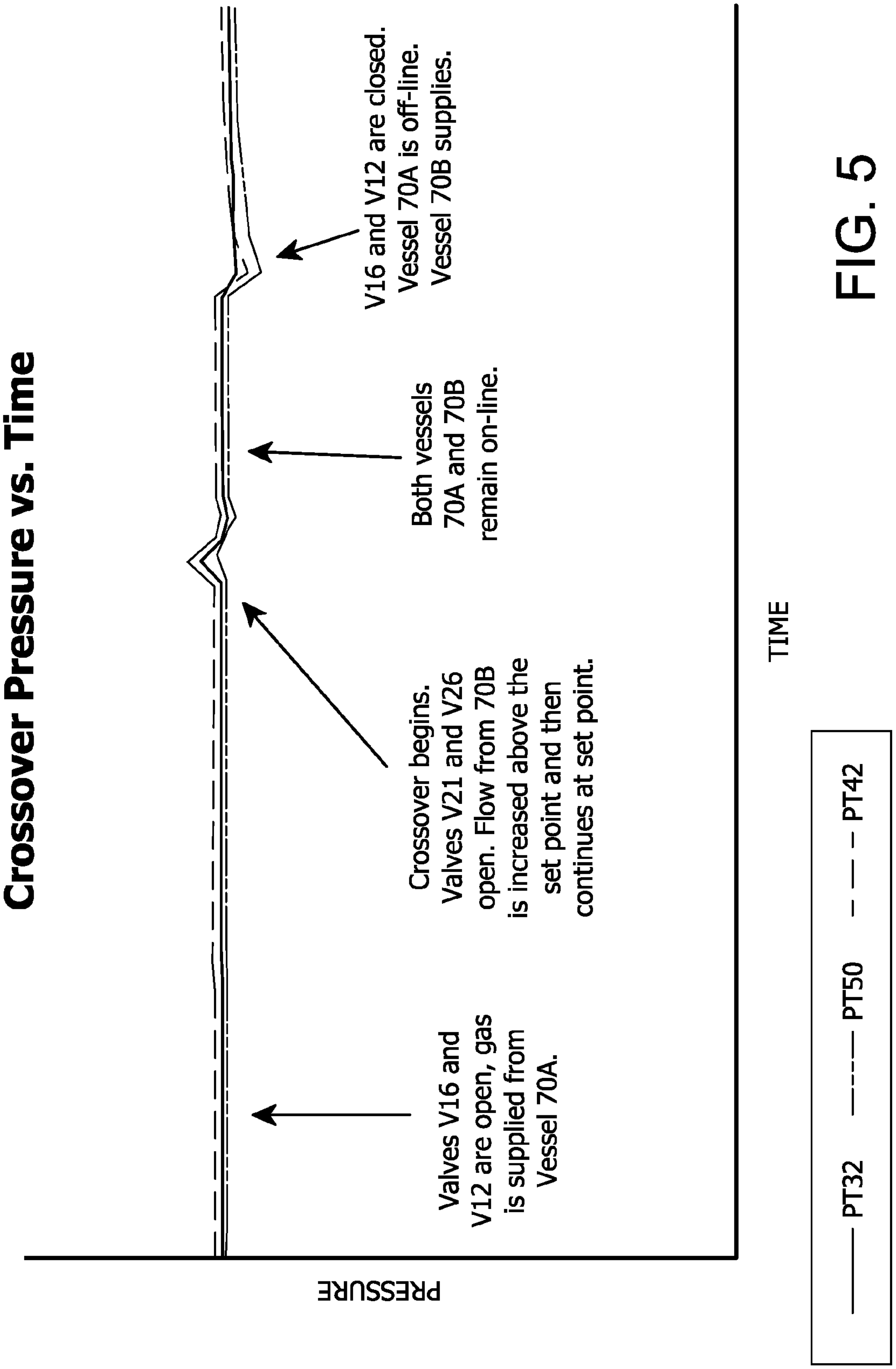
FIG. 5 is a graph of pressure vs. time measured during the crossover of a gas delivery system in accordance with this invention.

The just-described process was used in a 2 cylinder test system modified and operated in accordance with this invention. The cross-over process and the pressure change versus time graph shown in FIG. 5 was generated. FIG. 5, shows that the system of this invention eliminates the large pressure drop characteristic of the operation of the prior art system as shown in FIG. 1 has been eliminated or significantly reduced. The resultant reduction in process variability is believed to have the benefit of improving overall process control and increasing product yield at semiconductor facilities by consistent flow of the process gas to tools requiring the same.

The foregoing invention has been illustratively described above in reference to particular embodiments. It will be recognized, however, that the invention is not thus limited, but rather may be practiced with any multiple vessel array in which a crossover of gas supply from one vessel to another in the multiple vessel array. Further, although the invention has been illustratively described in reference to a two-vessel array, it will be recognized that the invention is amenable to implementation in multiple vessel arrays including more than two gas supply vessels. Additionally, although the gas cabinet was shown and described with reference to FIG. 3, the invention can be adopted to large gas supply systems in which the gas vessels are not housed in a cabinet as shown in FIG. 2. Also, while the invention has been described with reference to specific circuitry and control elements and relationships herein, it will be recognized that the general methodology of the invention as illustratively set out and described with reference to figures hereof can be implemented in any of numerous hardware/software configurations and formats.

It will be appreciated that the apparatus and method of the invention may be practiced in a widely variant manner, consistent with the broad disclosure herein. Accordingly, while the invention has been described herein with reference to specific features, aspects, and embodiments, it will be recognized that the invention is not thus limited, but is susceptible of implementation in other variations, modifications and embodiments. Accordingly, the invention is intended to be broadly construed to encompass all such other variations, modifications and embodiments, as being within the scope of the invention hereinafter claimed.

The invention claimed is:

1. A gas supply and dispensing system, comprising:

an array of at least two gas storage and dispensing vessels arranged for sequential on-stream dispensing involving crossover from a first one or more on-stream vessels to a first one or more standby vessels in the array, said system used to dispense gas at a preset gas flow rate;

a manifold comprising piping and at least two valves in fluid communication with the array of vessels;

a controller; and one or more sensors in communication with the controller, wherein said one or more sensors sense one or more predefined endpoints of the first one or more on-stream vessels thereby causing the controller to initiate auto-crossing from the first one or more on-stream vessels to the first one or more standby vessels in the array having gas therein, for subsequent dispensing of gas from said first one or more standby vessels;

wherein the controller after sensing the one or more predefined endpoints initiates flow of gas from said first one or more standby vessels, said first one or more standby vessels thereby becoming the second one or more on-stream vessels dispensing gas concurrently with said first one or more on-stream vessels for a period prior to terminating the flow of gas from the first one or more on-stream vessels;

wherein during said period prior to terminating the flow of the gas from the first one or more on-stream vessels, the controller increases the flow of the gas from the second one or more on-stream vessels to a flow rate that is greater than the preset gas flow rate, and then after sensing that the flow rate is above the preset flow rate, decreases the flow rate from the second one or more on-stream vessels to the preset gas flow rate.

2. The gas supply and dispensing system of claim 1 wherein the period provides enough time for the first one or more on-stream vessels and the second one or more on-stream vessels to reach equilibrium.

3. The gas supply and dispensing system of claim 1, wherein during said period prior to terminating the flow of the gas from the first one or more on-stream vessels, the controller increases the flow of the gas from the second one or more on-stream vessels to a flow rate that is greater than the preset gas flow rate.

4. The gas supply and dispensing system of claim 3, wherein the controller further comprises a timer that is activated to define the period during which the flow rate from the second one or more on-stream vessels is greater than the preset gas flow rate and triggers the system to decrease the flow rate of gas from the second one or more on-stream vessels at the end of a defined amount of time measured by the timer.

5. The gas supply and dispensing system of claim 1, wherein during said period prior to terminating the flow of the gas from the first one or more on-stream vessels, the controller increases the flow of the gas from the second one or more on-stream vessels to a flow rate that is greater than the preset gas flow rate, then after sensing that the flow rate is above the preset flow rate, decreases the flow rate from the second one or more on-stream vessels to the preset gas flow rate, and terminates the flow from the first one or more on-stream vessels.

6. The gas supply and dispensing system of claim 1, wherein the controller further comprises a timer that is activated when the predefined endpoint is sensed, to define the period during which the second one or more on-stream vessels and the first one or more on-stream vessels are dispensing said gas, and triggers the system to terminate the flow of gas from the first one or more on-stream vessels at the end of the period.

7. The gas supply and dispensing system of claim 1, wherein the one or more sensors are selected from pressure transducers, timers, weight scales, mass flow controllers, and temperature sensors.

8. The gas supply and dispensing system of claim 1, wherein the one or more predefined endpoints comprise a predefined endpoint weight of the one or more on-stream vessels.

9. The gas supply and dispensing system of claim 1, wherein the one or more predefined endpoints comprise a predefined endpoint pressure of gas dispensed from the one or more on-stream vessels.

10. The gas supply and dispensing system of claim 1, wherein the one or more predefined endpoints comprise a predefined endpoint flow rate of gas dispensed from the one or more on-stream vessels.

11. The gas supply and dispensing system of claim 1, wherein the one or more predefined endpoints comprise a predefined endpoint cumulative volume of gas dispensed from the one or more on-stream vessels.

12. The gas supply and dispensing system of claim 1, wherein the one or more predefined endpoints comprise a predefined endpoints rate of change of a characteristic of gas dispensed from the one or more on-stream vessels.

13. The gas supply and dispensing system of claim 1, wherein the one or more predefined endpoints comprise a predefined endpoint dispensing time of gas dispensing from the one or more on-stream vessels.

14. The gas supply and dispensing system of claim 1, wherein the manifold comprises one or more pressure transducers to measure the gas pressure of the one or more on-stream vessels.

15. The gas supply and dispensing system of claim 1, wherein the manifold comprises a process gas supply line and one or more pressure transducers located in said process gas supply line to measure the pressure of the gas flowing in said process gas supply line.

16. The gas supply and dispensing system of claim 1, wherein said manifold comprises one or more control valves having a proportional integrating derivative (PID) control loop to control the flow of the gas.

17. The gas supply and dispensing system of claim 16, wherein said one or more control valves having a proportional integrating derivative (PID) control loop is operatively coupled with a pressure transducer.

18. The gas supply and dispensing system of claim 1, wherein the gas storage and dispensing vessels are disposed in a gas cabinet.

19. The gas supply and dispensing system of claim 1, wherein said valves comprise process isolation valves wherein the system substantially reduces pressure variation of gas dispensed by the system, in relation to a gas supply and dispensing system wherein the crossover from said first one or more on-stream vessels to said second one or more stand-by vessels.

20. A method of substantially reducing pressure variation of gas dispensed from a gas supply and dispensing system comprising:

an array of at least two gas storage and dispensing vessels arranged for sequential on-stream dispensing involving crossover from a first one or more on-stream vessels to a first one or more standby vessels in the array, said system used to dispense gas at a preset gas flow rate comprising the steps of:

supplying the process gas from said first one or more on-stream vessels;

depleting the process gas from said first one more on-stream vessels;

sensing one or more predefined endpoints for said one or more first on-stream vessels;

opening one or more valves to begin supplying the process gas from said first one or more standby vessels, said first one or more standby vessels thereby becoming the second one or more on-stream vessels dispensing the process gas concurrently with said first one or more on-stream vessels;

increasing the flow of the process gas from the second one or more on-stream vessels above a preset flow rate;

detecting the increased flow rate from the second one or more on-stream vessels;

retuning the gas flow from the second one or more on-stream vessels to the preset flow rate; and closing one or more valves to isolate the first one or more on-stream vessels from the system.

21. The method of claim 20 further comprising the step of starting a cross-over timer upon said opening step, wherein said cross-over timer measures a preset period of time until said step of closing said one or more valves to isolate the first one or more on-line vessels from the system.

22. The method of claim 20, wherein said system further comprises one or more sensors selected from a weight sensor, pressure transducer, flowrate sensor, volumetric flowmeter, volumetric cumulative flowmeter, cycle timer, temperature sensor, and combinations thereof for performing said sensing step.

23. The method of claim 20, further comprising the step of checking the presence and status of the first one or more standby vessels prior to said opening step.

24. The method of claim 20, wherein said sensing step senses a decreased flowrate of the process gas measured by a pressure sensor, or a decreased rate of change of one or more characteristics of the process gas.

25. The method of claim 20, further comprising the step of allowing the second one or more on-stream vessels dispensing gas concurrently with said first one or more on-stream vessels to equilibrate prior to said increasing step.

26. The method of claim 25 wherein said allowing step is measured by an equalization timer that is initiated at the opening step.

27. The method of claim 20, wherein the system will sound an alarm if an error is detected in any of the steps.

28. The method of claim 20, wherein after said closing step, the method further comprises the step of replacing said first one or more on-stream vessels with one or more fresh vessels.

29. The method of claim 28, wherein said system further comprises a manifold in fluid communication with the first one or more on-stream vessels, and prior to the step of removing said first one or more on-stream vessels, said method further comprises the steps of venting and purging the manifold.

30. The method of claim 28, wherein the second one or more on-stream vessels are the first one or more on-stream vessels and the fresh one or more vessels are the first one or more standby vessels.

31. The method of claim 20, wherein the one or more predefined endpoints are selected from an endpoint weight of the first one or more on-stream vessels, an endpoint pressure of gas dispensed from the first one or more on-stream vessels, an endpoint flow rate of gas dispensed from the first one or more on-stream vessels, an endpoint cumulative volume of gas dispensed from the first one or more on-stream vessels, an endpoint rate of change of a characteristic of gas dispensed from the first one or more on-stream vessels, and an endpoint dispensing time of gas dispensing from the first one or more on-stream vessels.

32. The method of claim 20, wherein the step of increasing the flow of the process gas from the second one or more on-stream vessels above a preset flow rate is performed by using a proportional integrating derivative (PID) control loop operatively coupled with a pressure transducer in fluid communication with the second one or more on-line vessels.

* * * * *